United States Patent
Sheth et al.

(10) Patent No.: US 12,408,671 B2
(45) Date of Patent: *Sep. 9, 2025

(54) SYNERGISTIC AGRICULTURAL FORMULA COMPRISING DIACYL OR DIARYL UREA AND AT LEAST ONE MIXTURE OF NUTRIENTS

(71) Applicant: Corteva Agriscience LLC, Indianapolis, IN (US)

(72) Inventors: Ritesh Sheth, Friendswood, TX (US); Jerry Stoller, Houston, TX (US); Robert R. Shortell, Houston, TX (US)

(73) Assignee: Corteva Agriscience, LLC, Indianapolis, IN (US)

( * ) Notice: Subject to any disclaimer, the term of this patent is extended or adjusted under 35 U.S.C. 154(b) by 476 days.

This patent is subject to a terminal disclaimer.

(21) Appl. No.: 15/885,710

(22) Filed: Jan. 31, 2018

(65) Prior Publication Data

US 2018/0213787 A1 Aug. 2, 2018

Related U.S. Application Data

(60) Provisional application No. 62/452,513, filed on Jan. 31, 2017.

(51) Int. Cl.
| | | |
|---|---|---|
| *A01N 47/34* | (2006.01) | |
| *A01N 47/30* | (2006.01) | |
| *A01N 59/06* | (2006.01) | |
| *A01N 59/20* | (2006.01) | |
| *A01N 59/26* | (2006.01) | |
| *C05C 9/00* | (2006.01) | |
| *C05G 1/00* | (2006.01) | |

(52) U.S. Cl.
CPC ............. *A01N 47/34* (2013.01); *A01N 47/30* (2013.01); *A01N 59/06* (2013.01); *A01N 59/20* (2013.01); *A01N 59/26* (2013.01); *C05C 9/00* (2013.01); *C05G 1/00* (2013.01); *A01N 2300/00* (2013.01); *Y02A 40/10* (2018.01)

(58) Field of Classification Search
None
See application file for complete search history.

(56) References Cited

U.S. PATENT DOCUMENTS

| | | | | |
|---|---|---|---|---|
| 4,315,763 A | | 2/1982 | Stoller et al. | |
| 4,328,025 A | | 5/1982 | Whitcomb | |
| 4,581,056 A | | 4/1986 | Nooden | |
| 5,614,653 A | * | 3/1997 | Dean | C07F 5/04 556/133 |
| 5,997,600 A | * | 12/1999 | Dean | C05G 5/20 71/27 |
| 6,040,273 A | * | 3/2000 | Dean | A01N 47/34 504/327 |
| 8,207,091 B2 | | 6/2012 | Stoller | |
| 2006/0254136 A1 | | 11/2006 | Van Rensburg | |
| 2008/0307845 A1 | | 12/2008 | Marks | |
| 2013/0116119 A1 | * | 5/2013 | Rees | A01N 37/10 504/103 |
| 2015/0150261 A1 | | 6/2015 | Liptay | |
| 2016/0007541 A1 | * | 1/2016 | Stoller | A01G 22/00 47/58.1 SE |
| 2016/0318817 A1 | | 11/2016 | Chand | |
| 2016/0330963 A1 | | 11/2016 | Papadopoulos | |

FOREIGN PATENT DOCUMENTS

| | | |
|---|---|---|
| CN | 104109021 | 10/2014 |
| EP | 0114960 A2 | 8/1984 |
| KR | 20130142398 | 12/2013 |
| SU | 639502 | 12/1978 |
| TW | 201701762 | 1/2017 |
| WO | 9737524 | 10/1997 |
| WO | 2006134361 A2 | 12/2006 |
| WO | 2016007941 A1 | 1/2016 |

OTHER PUBLICATIONS

TruPhos Platinum (http://www.andaman-ag.com/andaman-wordpress/wp-content/uploads/2015/12/TruPhos-Platinum-GHS-2016-USA.pdf, cached google Dec. 1, 2016 ) (Year: 2016).*
StollerUSA (http://keylate.com/assets/media/label/Keylate%20SuperStarter%20NEW%20LABEL%20V1.pdf, date taken from related issued patent 5997600) (Year: 1999).*
Plant Nutrients (https://web.archive.org/web/20080921220201/http://www.ncagr.gov:80/cyber/kidswrld/plant/nutrient.htm, cached Sep. 21, 2008 (Year: 2008).*
TruPhos Safety Data Sheet (http://www.agrica.co.il/media/1731/%D7%98%D7%A8%D7%95% D7%A4%D7%95%D7%A1-%D7%A4%D7%9C%D7%98%D7%99%D7%A0%D7%95%D7%9D.pdf), accessed Nov. 15, 2018 (Year: 2016).*
X-Tra Power (https://stollerusa.com/wp-content/uploads/2020/01/X-TraPower21x7.5Label.pdf) references that the product is patented with U.S. Pat. No. 5,997,600, which dates the product to at least 1999, no pagination. (Year: 1999).*
Missouri (https://mospace.umsystem.edu/xmlui/bitstream/handle/10355/51767/mg0004-2009.pdf?sequence=1, 2009, p. 1-10) (Year: 2009).*
Bio-Forge label (https://www.legumematrix.com/images/563/BioForgeLabel.pdf) US Patent for bioforge is U.S. Pat. No. 6,040,273 which dates the product to at least 2000. (Year: 2000).*
Tru-Phos Platinum SDS https://s3-us-west-1.amazonaws.com/agrian-cg-fs1-production/pdfs/TruPhos_Platinum_5-18-2_MSDS1.pdf no pagination. (Year: 2012).*

(Continued)

*Primary Examiner* — Erin E Hirt
(74) *Attorney, Agent, or Firm* — Yancy IP Law, PLLC

(57) ABSTRACT

A synergistic agricultural formula including at least one diacyl or diaryl urea, such as a N,N'-diformylurea, and at least one mixture of nutrients, such as a mixture of micronutrients and/or macronutrients. This synergistic agricultural formula gives those skilled in the art the ability to regulate important phenotypical parameters that lead to a variety of important agronomic and horticulture traits which improve crop yield parameters leading beyond that of its individual components.

17 Claims, 3 Drawing Sheets

(56) References Cited

OTHER PUBLICATIONS

X-tra Power specimen label: https://www.mafascaribbean.com/site/pdf/crophealth-xtrapower-label.pdf, no pagination known since at least 1999 (publication date of U.S. Pat. No. 5,997,600 (which is the patent for X-Tra Power)). No pagination.*

Slaton, et al., "Soybean Response to Short- and Long-Term Fertilization and/or Foliar Amendment", Arkansas Soil Fertility Studies 2013, pp. 72-77.

Stoller Enterprise Canada Product Guide (http://stollercanada.ca/wp-content/uploads/2013/06/2016-SE-Product-Guide-copy-00000002.pdf).

Stoller's Chelate Guide (https://web.archive.org/web/20160709180459/http://stoller.com.au/assets/images/pdfs/9A_StollersChelateGuide_Aug14.pdf).

* cited by examiner

SYNERGISTIC AGRICULTURAL FORMULA COMPRISING DIACYL OR DIARYL UREA AND AT LEAST ONE MIXTURE OF NUTRIENTS

CROSS REFERENCE TO RELATED APPLICATION

This application claims the benefit, under 35 U.S.C. 119(e), of U.S. Provisional Application No. 62/452,513 filed Jan. 31, 2017, the contents of which are incorporated herein by reference.

BACKGROUND OF THE INVENTION

1. Field of the Invention

The present invention generally relates to a synergistic agricultural formula including at least one diacyl or diaryl urea and at least one mixture of nutrients to produce a highly pronounced increase in plant growth, development and yield in plant cells and whole plant culture.

2. Description of the Background

Essential nutrients are required by all plants to complete their lifecycle. Essential nutrients are generally classified into two groups, micronutrients and macronutrients, based on the amount required by the plant for normal growth and development to occur. Macronutrients are required in higher concentrations (0.2 to 4.0% on a dry weight basis) then micronutrients (less than 0.02% on a dry weight basis). In agriculture essential nutrient concentration (or lack thereof) limits yield, quality and plant productivity which hinders the producer's ability to take profits. This effect is further confounded in intensively managed cropping situations common to agriculture where yield goal estimates are used to determine fertilizer applications. Nutrient deficiencies in crop plants directly results in yield loss because plants can only achieve the yield level dictated by the most limiting nutrient. As such, farmers dictate fertilizer recommendations based on economics instead of agronomy and generally limit the capacity of their own fields. Therefore, synergy between management inputs that result in a better response from the same amount of input is highly desirable from both the agronomic and economic points of view.

N,N'-diformylurea is a proprietary organic molecule that was initially designed to inhibit ethylene production in plants. It functions by quenching the reactive oxygen species signal that causes the conversion of ACC to ethylene. This molecule shows dramatic effects in inhibiting excess cellular ethylene resulting in the maintenance of hormonal balance, plant growth and productivity.

SUMMARY OF THE INVENTION

The synergistic agricultural formula of the present invention includes at least one diacyl or diaryl urea, such as a N,N'-diformylurea, and at least one mixture of nutrients. The mixture of nutrients is preferably selected from micronutrients and/or macronutrients. The synergistic agricultural formula is applied to plants at physiologically sensitive times providing a synergistic interaction of the base components resulting in increased yield and quality of the crop being grown. This synergistic agricultural formula gives those skilled in the art the ability to enhance plant growth and regulate important phenotypical parameters that lead to a variety of important agronomic and horticulture traits which improve crop yield parameters leading beyond that of its individual components. More specifically, this synergistic agricultural formulation can be used to improve plant yield parameters leading to increased yield and quality of economically important crops. These yield parameters include, but are not limited to, root weight, length and architecture, flower, fruit and grain set, stem diameter, tillering/branching and placement, net photosynthesis, plant height and stature, harvestable fruit and grain protein, and sugar and/or starch content leading to increased crop yield and quality and maximum system productivity.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE INVENTION

Figure 1:
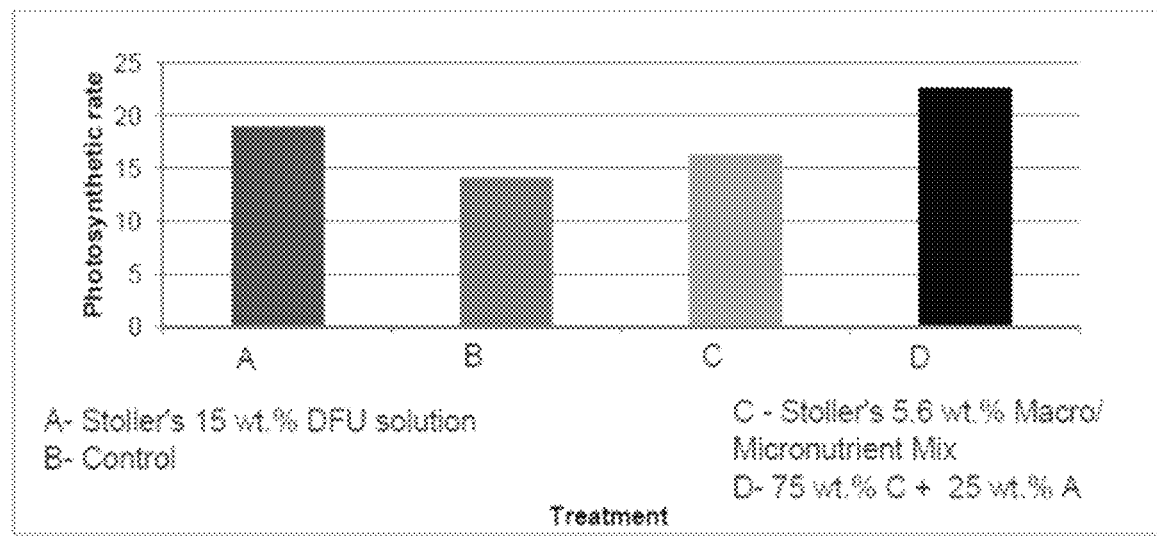
FIG. 1 is a graph showing the impact on photosynthesis rate on a plant using a synergistic agricultural formula in accordance with the present invention including a 1:3 wt/wt ratio of Stoller's 15 wt. % DFU SOLUTION and Stoller's 5.6 wt. % Macro/Micronutrient mix applied at a Pint/Acre compared to each individual component applied at a Pint/Acre.
Figure 2:
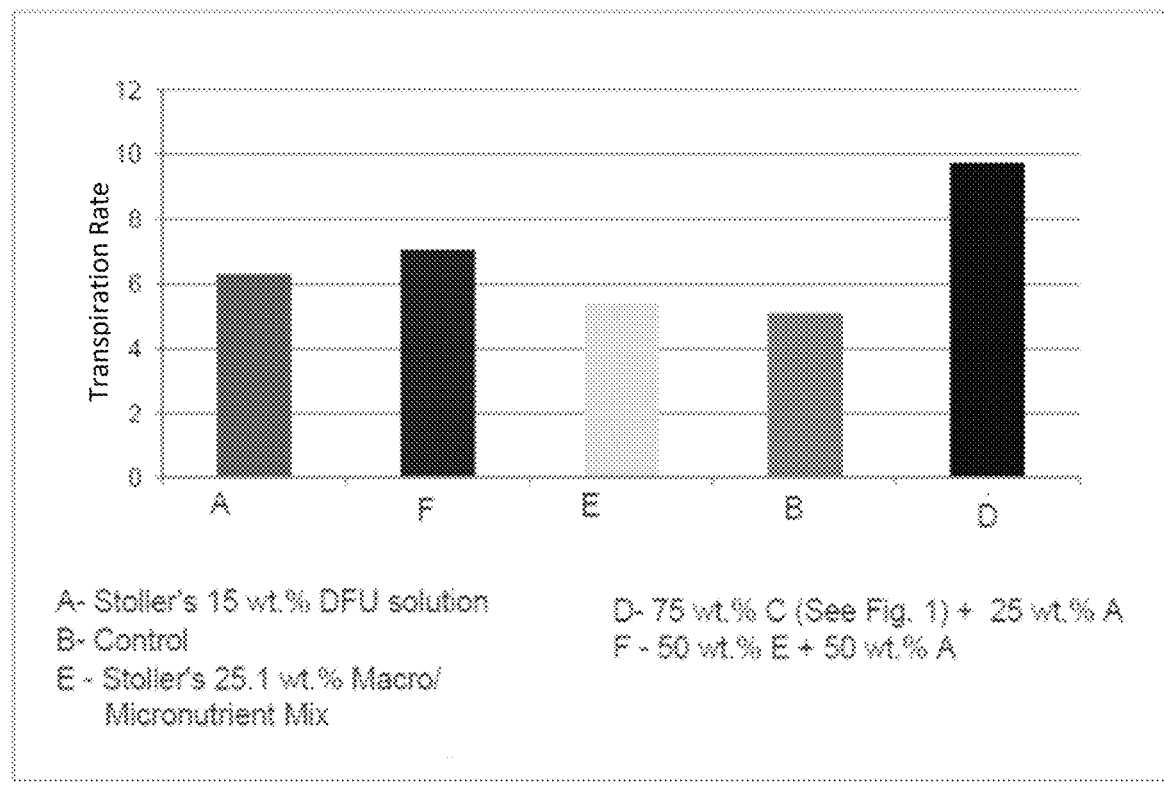
FIG. 2 is a graph showing the impact on transpiration rate on a plant using a synergistic agricultural formula in accordance with the present invention including 1:3 wt/wt ratio of Stoller's 15 wt. % DFU SOLUTION and Stoller's 5.6 wt. % Macro/Micronutrient mix and a 1:1 wt/wt ratio of Stoller's 15 wt. % DFU SOLUTION and Stollers' 25.1 wt. % Macro/Micronutrient Mix applied at a Pint/Acre compared to each individual component applied at a Pint/Acre.
Figure 3:
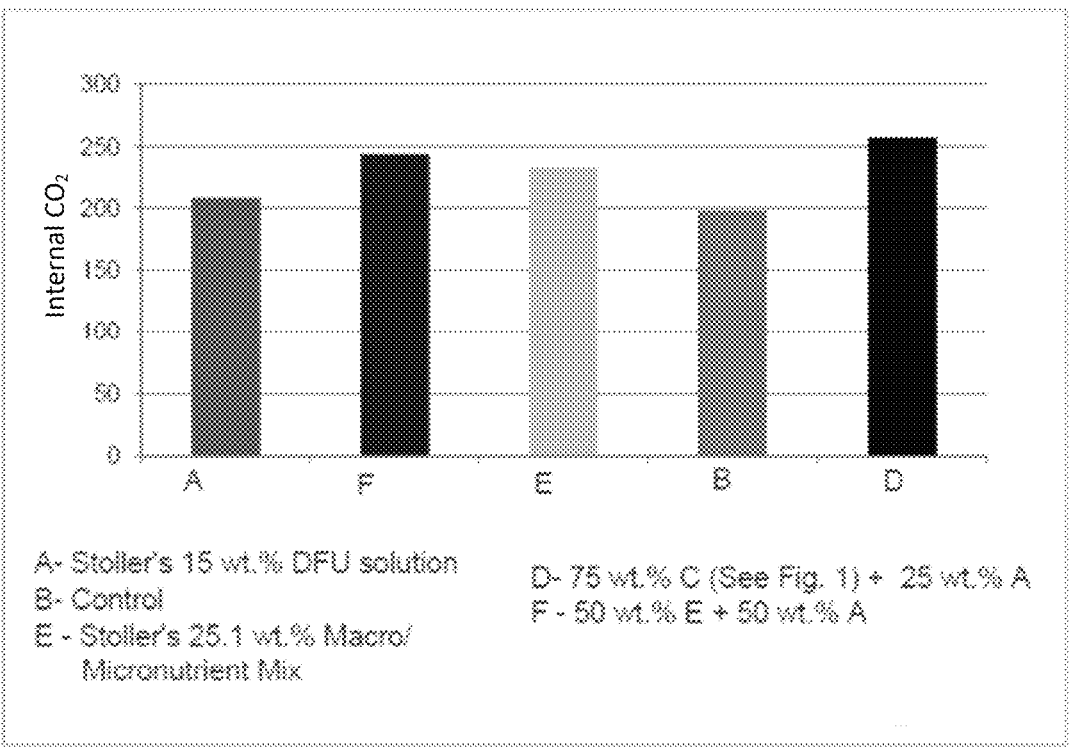
FIG. 3 is a graph showing the impact on Internal $CO_2$ on a plant using a synergistic agricultural formula in accordance with the present invention including 1:3 wt/wt ratio of Stoller's 15 wt. % DFU SOLUTION and Stoller's 5.6 wt. % Macro/Micronutrient mix and 1:1 wt/wt ratios of Stoller's 15 wt. % DFU SOLUTION and Stoller's 25.1 wt. % Macro/Micronutrient Mix applied at a Pint/Acre compared to each individual component applied at a Pint/Acre.
Figure 4:
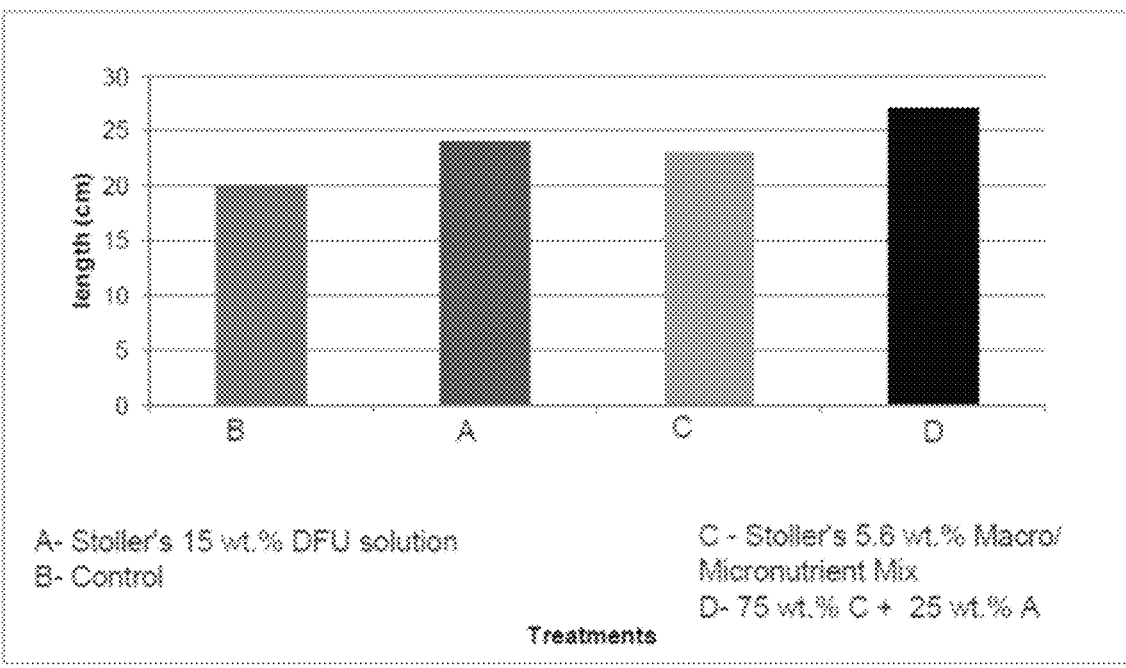
FIG. 4 is a graph showing the impact on root length of a plant using a synergistic agricultural formula in accordance with the present invention including a 1:3 wt/wt ratio of Stoller's 15 wt. % DFU SOLUTION and Stoller's 5.6 wt. % Macro/Micronutrient mix applied at a Pint/Acre compared to each individual component applied at a Pint/Acre.

The present invention is an effective synergistic agricultural formula which comprises from 99.9 to 0.1 wt. % of at least one diacyl or diaryl urea and from 0.1 to 99.9 wt. % of at least one mixture of nutrients. In one embodiment, the agricultural formula comprises from 30-0.1 wt. % of at least one diacyl or diaryl urea, preferably diformylurea, and from 0.1 to 25 wt % of at least one mixture of nutrients. In one embodiment, the agricultural formula comprises from 30-0.1 wt. % of at least one diacyl or diaryl urea, preferably diformylurea, and from 0.1 to 10 wt % of at least one mixture of nutrients. In one embodiment, the agricultural formula comprises from 30-0.1 wt. % of at least one diacyl or diaryl urea, preferably diformylurea, and from 0.1 to 5 wt % of at least one mixture of nutrients.

The at least one mixture of nutrients in the above-mentioned agricultural formula is preferably selected from micronutrients and macronutrients of non-metal, metalloid and/or metal complex. In one embodiment of the present invention, the mixture of nutrients includes metal complexes of manganese, zinc, magnesium, copper, and/or other metals. In another embodiment of the present invention, the mixture of nutrients includes nitrogen, $P_2O_5$, $K_2O$, and boron. The mixture of nutrients is preferably supplied in a water soluble form so that they may be absorbed by the plant.

When diacyl and/or diaryl urea formulations are combined with at least one mixture of nutrients including nonmetal, metalloid and metal-complex containing nutrient formulations including, but not limited to, plant essential trace minerals with or without mono- and/or divalent charges the resulting formulation shows biological responses in plants with synergistic effects to either essential nonmetal, metalloid and metal-complex or diacyl and diaryl urea compounds alone. The resulting synergistic effect of the combined formulation causes a maximum response in the yield parameters evaluated at a reduced concentration when compared to the individual components alone. The resulting formulation dramatically increases product efficiency, crop yield, quality and productivity leading to increased profitability at the farm gate while simultaneously reducing the amount of exogenous chemicals needed for agriculture and thus limiting the associated off target risks modern agriculture poses the environment.

The present invention is a benefit to crop system management and crop yield in the agriculture and horticultural industries. When applied during germination and establishment this results in an improvement in root and shoot architecture. When applied during the vegetative stage, increased rate of growth and development are observed. When applied at flowering this results in improved fruit or grain set. When applied during fruit sizing and grain fill this results in increased photosynthesis, larger, more marketable fruit, and increased grain fill.

While those skilled in the art will be able to prepare an aqueous solution of the synergistic agricultural formula at desired concentration depending on agricultural uses, it has been found that solutions containing from about 0.001-1.0 M of the active ingredients, i.e diacyl or diaryl urea and metal complex, are beneficial. Aqueous solutions containing from about 0.001-0.050 M are presently preferred for soil and foliar applications. While these solutions may be applied at any rate desired by those of skill in the art, it has been found that aqueous solutions of the foregoing concentration provide optimum results when applied at the rate of about 4-16 oz/A for foliar or soil and 15-750 ml. per 100 lbs of seed. Those skilled in the art would be aware that addition of an oil and/or surfactant, i.e. less than 5 wt. %, or preferably less than 1 wt. %, to the aqueous solution sprayed on the foliage will improve the adherence of the reaction product to the leaves and the uptake of the reaction product by the plant. Suitable oils include both saturated and unsaturated oils, alcohols, esters and other compounds having both hydrophobic and hydrophilic functional groups. Exemplary oils comprise the vegetable oils and include sunflower oil and soybean oil. Exemplary biologically acceptable surfactants include the organic polyphosphates and ethoxylated nonylphenols. Again, those skilled in the art can determine appropriate concentrations for each desired use. However, aqueous solutions having the foregoing concentrations are believed to be generally appropriate. These solutions should be applied at a rate sufficient to provide about 1-100 grams of reaction product, non-metal, metalloid and metal containing complexes per acre. In alternate embodiment, the solutions should be applied at a rate sufficient to provide about 50-100 grams, or 70-100 grams, 85-100 grams of reaction product, non-metal, metalloid and metal containing complexes per acre.

In one preferred embodiment of the present invention, the agricultural formula consists essentially of 99.9 to 0.1 wt. % of at least one diacyl or diaryl urea and from 0.1 to 99.9 wt. % of at least one mixture of nutrients. In one embodiment, the agricultural formula consists essentially of from 30-0.1 wt. % of at least one diacyl or diaryl urea, preferably diformylurea, and from 0.1 to 20 wt % of at least one mixture of nutrients. In one embodiment, the agricultural formula consists essentially of from 20-0.1 wt. % of at least one diacyl or diaryl urea, preferably diformylurea, and from 0.1 to 10 wt % of at least one mixture of nutrients. In one embodiment, the agricultural formula consists essentially of from 20-0.1 wt. % of at least one diacyl or diaryl urea, preferably diformylurea, and from 0.1 to 5 wt % of at least one mixture of nutrients. The phrase "consists essentially of" for the purposes of this patent application shall be construed to provide that the basic and novel characteristics of the present invention are at least one of the following: increased plant growth, development, and/or yield in plant cells and whole plant culture when the aqueous solution is applied.

It is understood that the disclosure of a range of diacyl or diaryl urea and/or at least one mixture of nutrients includes all the values within the recited range such that 99.9 to 0.1 wt. % and 0.1 to 99.9 wt. % includes 98, 97, 96, 95, 94, 93, 92, 91, 90, 89, 88, 87, 86, 85, 84, 83, 82, 81, 80, 79, 78, 77, 76, 75, 74, 93, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, and 0.5 wt. %

In a preferred embodiment of the present invention the agricultural formula and/or aqueous solution including the synergistic agricultural formula does not include any "radiation managers" that are provided as an agent that facilitates passage of UV light and/or high energy visible blue light. In such embodiments, the present invention does not include colorants that screen UV and high energy visible blue light, for example, polyoxyalkylene UV absorbers. In such an embodiment, the present invention does not include insoluble oxides that can be micronized or presented as nanoparticles, such as titanium and/or zinc oxide. In such an embodiment, the present invention does not include pigments including phthalocyanines.

Diacyl or Diaryl Urea

As described in U.S. Pat. No. 6,040,273, the contents of which are expressly incorporated herein by reference, the preferred diacyl or diaryl urea of the present invention are the reaction products of a carboxylic acid and a urea having the formula

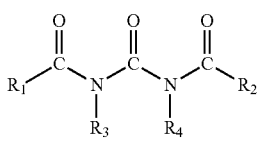

where $R_1$, $R_2$, $R_3$ and $R_4$ are the same or different and are selected from the group consisting of hydrogen, substituted and unsubstituted alkyl, allyl, vinyl and alkoxyl groups having from 1-6 carbon atoms, substituted and unsubstituted phenyl groups and the halides. Preferably, the reaction product of the present invention is N,N'-diformylurea or N,N'-diacetylurea. In one embodiment, these reaction products are prepared by reacting a carboxylic acid having the formula RCOOH where R is selected from the group consisting of hydrogen, substituted and unsubstituted alkyl, allyl, vinyl and alkoxyl groups having from 1-6 carbon atoms, substituted and unsubstituted phenyl groups and the halides. Exemplary acids include formic acid, acetic acid, propionic acid, butyric acid, valeric acid, caproic acid, heptanoic acid, and citric acid. Preferably R is selected from the group consisting of hydrogen and unsubstituted alkyl groups having from 1-3 carbon atoms. The presently most preferred acids are formic or acetic acid. These carboxylic acids are reacted with a substituted or unsubstituted urea having the formula $(NHR')_2CO$ where each R' is the same or different and is selected from the group consisting of hydrogen, substituted and unsubstituted alkyl groups having from 1-6 carbon atoms, substituted and unsubstituted alkoxyl groups having from 1-6 carbon atoms, substituted and unsubstituted phenyl groups and the halides. Unsubstituted urea is the presently most preferred reactant. In its most preferred embodiment, the present invention comprises the reaction product of urea and formic acid, i.e., N,N'-diformylurea, having the following formula

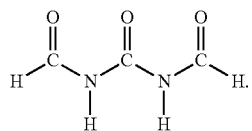

Furthermore, the agricultural formula may include diaryl ureas including, but not limited to, forchlorfenuron having the general formula:

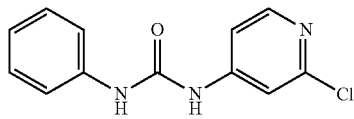

It has been found that the reaction proceed throughout a wide range of temperatures, e.g., from about 10° C. to about 140° C., restricted only by the boiling points of the reactants and products. While heat may be added by any conventional means to speed the rate of these reactions, it has been found that the methods of the present invention may conveniently be performed in a temperature range from about 15° C. to about 40° C., preferably at room temperature, i.e., from about 20° C. to about 30° C. These reactions appear to be slightly exothermic. The reaction of formic acid and urea to form diformylurea proceeds to completion within 24 hours at room temperature. It is preferred that the reaction mixture be stirred until clear and then permitted to remain quiescent until crystals of the reaction product have formed. It is believed that the reactions proceed by the elimination of two water molecules: The reaction of urea and formic acid proceeds as follows: $H_2NCONH_2 + 2RCOOH \rightarrow R\text{-}CONHCONHCOR + 2H_2O$. In this reaction, formic acid reacts with one hydrogen on each of the urea nitrogens to produce N,N'-diformylurea. Accordingly, it is preferred that the reaction mixture comprise about 2 moles of carboxylic acid for each mole of urea.

A commercial embodiment of the at least one diacyl or diaryl urea included in the present agricultural formula includes STOLLER'S 15 wt % DFU SOLUTION (manufactured by Stoller Enterprises, Inc. in Houston, Texas, USA). Also, see U.S. Pat. Nos. 6,448,440 and 6,710,085, the contents of which are incorporated herein by reference.

Mixture of Nutrients

The mixture of nutrients includes nonmetal, metalloid and/or metal-complex containing micronutrient and/or macronutrient formulations. The metal complex may be provided as an aqueous solution including a metal selected from the group consisting of the alkaline earth metals, the transition metals, boron and mixtures thereof. In one embodiment, the metals are selected from the micronutrients boron, manganese, iron, zinc, copper, molybdenum, nickel and cobalt and mixtures thereof. In another embodiment, the mixture of nutrients includes macronutrients nitrogen, phosphorus, potassium, calcium, sulfur, magnesium and mixtures thereof. Preferred metals are considered essential nutrients in agriculture and may include but are not limited to magnesium, copper, manganese and zinc. When included, these micronutrients may be present in an aqueous solution in a range from about 0.001 to about 10.0 percent-by-weight, preferably from about 0.001 to about 5.0 percent-by-weight, more preferably 1 to 3 percent-by-weight based on the overall weight of the agricultural formula of the present invention. When included, these macronutrients may be present in an aqueous solution in a range from about 0.001 to about 50.0 percent-by-weight, preferably from about 0.01 to about 20.0 percent-by-weight, more preferably 0.1 to 10 percent-by-weight based on the overall weight of the agricultural formula of the present invention. By way of example, a micronutrient/macronutrient mixture of nutrients may include nitrogen, $P_2O_5$, $K_2O$, and boron. In one embodiment, this micronutrient/macronutrient mixture may include 1-30 wt % nitrogen, 1-50 wt % $P_2O_5$, 1-50 wt % $K_2O$, and 0.01-1 wt % micronutrient based on the overall weight of the agricultural formula of the present invention. In another embodiment, this micronutrient/macronutrient mixture may include 3-7 wt % nitrogen, 15-22 wt % $P_2O_5$, 1-4 wt % $K_2O$, and 0.05-0.5 wt % micronutrient based on the overall weight of the agricultural formula of the present invention. In another embodiment, this micronutrient/macronutrient mixture may include about 5 wt % nitrogen, about 18 wt % $P_2O_5$, about 2 wt % $K_2O$, and about 0.1 wt % boron based on the overall weight of the agricultural formula of the present invention. The following Examples are used to illustrate one embodiment of the invention. However, it should be understood by one of ordinary skill in the art that other agricultural formulas may be modified from these preferred embodiments without departing from the scope of the present invention.

Examples

Maximization of Corn Yield

As those skilled in the art may attest, increased plant productivity leads to increased yield. Stoller's 15 wt % DFU solution mitigates the effect of stress ethylene by mitigating stress. Stoller's 5.6% chelated mixed macro/micronutrient complex (0.8% chelated magnesium, 0.8% chelated copper, 0.8% chelated manganese and 3.2% chelated zinc complex) is an aqueous solution that supports early season growth and development across a wide range of crops, including corn.

As seen in FIGS. 1-5, a synergistic agricultural formula in accordance with the present invention including Stoller's 15% DFU solution and Stoller's 5.6% chelated mixed macro/micronutrient complex is provided. In one embodiment, a 1:3 wt/wt ratio of Stoller's 15% DFU Solution and Stoller's 5.6% chelated mixed macro/micronutrient complex applied at a Pint/Acre was found to increase photosynthesis, respiration, and internal $CO_2$, root length when compared to each individual component applied at a Pint/Acre alone. Similarly, Stoller's 25.1 wt. % mixed Macro/Micronutrient complex (5% N, 18% $P_2O_5$, 2% $K_2O$, 0.1% B in water solution) mixed at a 1:1 wt/wt ratio with Stoller's 15 wt. % DFU Solution also provides a similar synergistic growth advantage than the individual components at a Pint/Acre. In another embodiment, a mixture of Stoller's 15 wt. % DFU Solution and Stoller's 5.6 wt. % chelated mixed macro/micronutrient complex applied at specified oz./Acre was found to increase yield when compared to each individual component applied at a specified oz./Acre alone.

Figure 5:
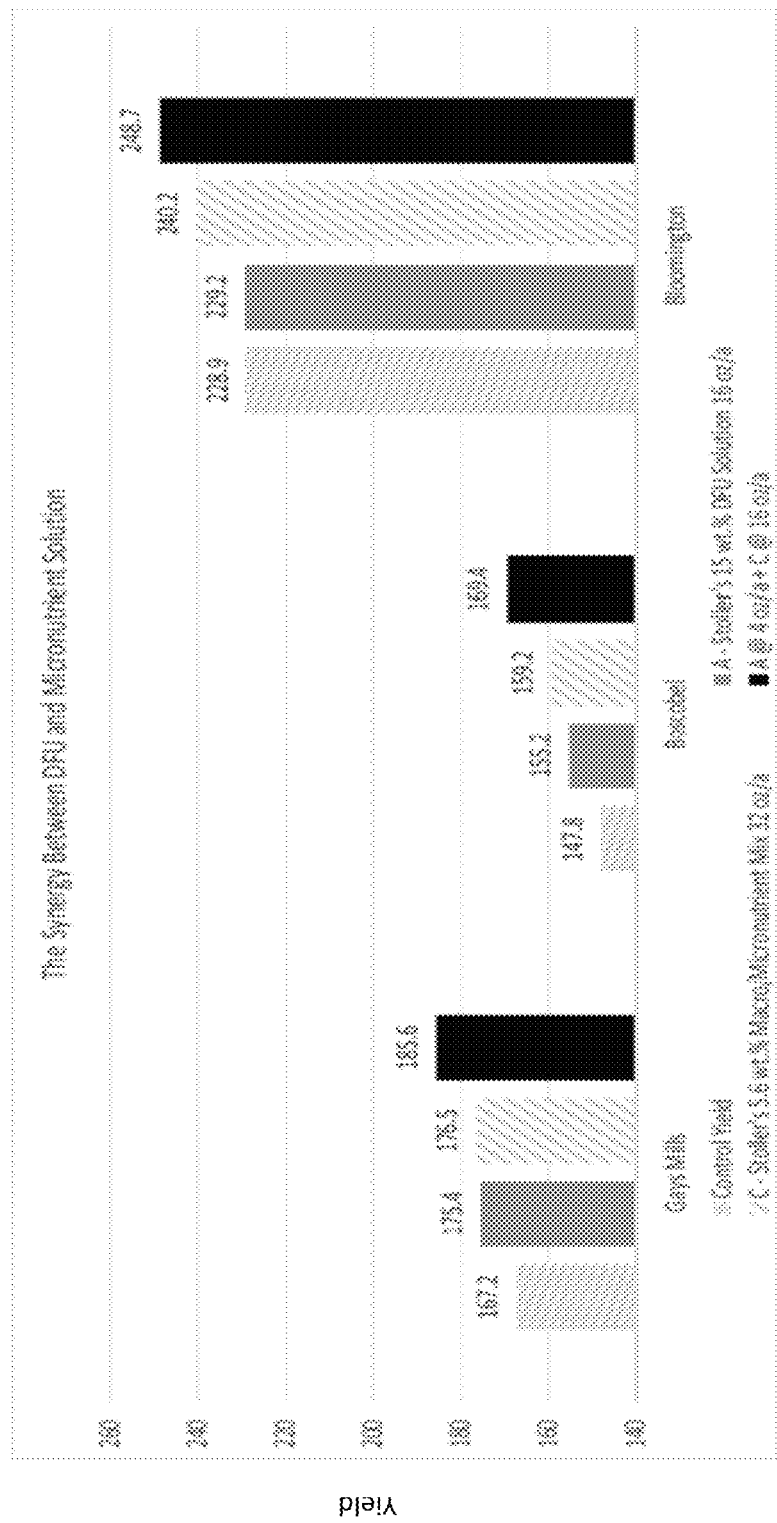
FIG. 5 is a graph showing the impact of increased yield using a synergistic formula in accordance with the present invention including a 1:4 wt/wt ratio of Stoller's 15 wt. % DFU SOLUTION and Stoller's 5.6 wt. % chelated Macro/Micronutrient Mix applied at the stated oz./acre compared to each individual component applied at the stated oz./acre in three different locations across the United States.

With respect to FIG. 5, Tables 1-3 provides statistic evidence that the data is statistically relevant:

TABLE 1

| | Gays Mills | | |
|---|---|---|---|
| | DFU Solution | Macro/Micronutrient Soln. | DFU + Macro/Micro Soln. |
| p vs Control | 0.0196 | 0.0198 | 0.0019 |
| p value vs DFU Soln | | 0.6884 | 0.0171 |
| p value vs Micro Soln | | | 0.0331 |

TABLE 2

| | Boscobel | | |
|---|---|---|---|
| | DFU Solution | Macro/Micronutrient Soln. | DFU + Macro/Micro Soln. |
| p vs Control | 0.0254 | 0.0072 | 0.0011 |
| p value vs DFU Soln | | 0.1625 | 0.0060 |
| p value vs Micro Soln | | | 0.0211 |

TABLE 3

| | Bloomington | | |
|---|---|---|---|
| | DFU Solution | Macro/Micronutrient Soln. | DFU + Macro/Micro Soln. |
| p vs Control | 0.8990 | 0.0236 | 0.0009 |
| p value vs DFU Soln | | 0.0249 | 0.0009 |
| p value vs Micro Soln | | | 0.0547 |

Although the present invention has been disclosed in terms of a preferred embodiment, it will be understood that numerous additional modifications and variations could be made thereto without departing from the scope of the invention as defined by the following claims:

We claim:

1. A synergistic agricultural formula that is absorbed by the plant comprising:
   30 to 0.5 wt. % diformylurea; and
   0.1 to 20 wt. % at least one mixture of nutrients provided as an aqueous solution so that said nutrients may be absorbed by the plant, wherein said at least one mixture of nutrients comprises magnesium, copper, manganese and zinc as the only nutrients present in said formula and wherein said nutrients are chelated compounds;
   optional oil,
   optional surfactant, and
   water, wherein said diformylurea and said at least one mixture of nutrients together provides synergy.

2. The synergistic agricultural formula of claim 1, wherein said at least one mixture of nutrients includes 0.001-5 wt. % magnesium, 0.001-5 wt. % copper, 0.001-5 wt. % manganese and 0.001-5 wt. % zinc based on the total weight of the agricultural formula, and wherein the magnesium, copper, manganese, and zinc are the only nutrients present in said formula.

3. The synergistic agricultural formula of claim 1, wherein said at least one mixture of nutrients includes 1-3 wt. % magnesium, 1-3 wt. % copper, 1-3 wt. % manganese and 1-3 wt. % zinc based on the total weight of the agricultural formula, and wherein the magnesium, copper, manganese, and zinc are the only nutrients present in said formula.

4. The synergistic agricultural formula of claim 1, wherein the diformylurea is present in 3-8 wt. %.

5. The synergistic agricultural formula of claim 2, wherein the diformylurea is present in 3-8 wt. %.

6. The synergistic agricultural formula of claim 3, wherein the diformylurea is present in 3-8 wt. %.

7. A synergistic agricultural formula that is absorbed by the plant comprising:
   30 to 0.5 wt. % diformylurea; and
   0.1 to 20 wt. % at least one mixture of nutrients provided as an aqueous solution so that said nutrients may be absorbed by the plant, wherein said at least one mixture of nutrients is a mixture including a water soluble form of nitrogen, $P_2O_5$, $K_2O$, and boron as the only nutrients in said formula;
   optional oil,
   optional surfactant, and
   water, wherein said diformylurea and said at least one mixture of nutrients together provides synergy.

8. The synergistic agricultural formula of claim 7, wherein said at least one mixture of nutrients includes 1-5 wt % a water soluble form of nitrogen, 1-10 wt % a water soluble form of $P_2O_5$, 1-4 wt % a water soluble form of $K_2O$, and 0.01-1 wt % boron based on the total weight of the agricultural formula, wherein the nitrogen, $P_2O_5$, $K_2O$, and boron are the only nutrients present in said formula.

9. The synergistic agricultural formula of claim 7, wherein said at least one mixture of nutrients includes 2-3 wt % a water soluble form of nitrogen, 8-10 wt % a water soluble form of $P_2O_5$, 1-2 wt % a water soluble form of $K_2O$, and 0.05-0.1 wt % boron micronutrient based on the total weight of the agricultural formula, wherein the nitrogen, $P_2O_5$, $K_2O$, and boron are the only nutrients present in said formula.

10. The synergistic agricultural formula of claim 7, wherein said at least one mixture of nutrients includes about 2.5 wt % a water soluble form of nitrogen, about 9 wt % a water soluble form of $P_2O_5$, about 1 wt % a water soluble form of $K_2O$, and about 0.05 wt % boron based on the total weight of the agricultural formula, wherein the nitrogen, $P_2O_5$, $K_2O$, and boron are the only nutrients present in said formula.

11. A synergistic agricultural formula of claim 7, wherein the diformylurea is present in 3-8 wt. %.

12. The synergistic agricultural formula of claim 8, wherein the diformylurea is present in 3-8 wt. %.

13. The synergistic agricultural formula of claim 9, wherein the diformylurea is present in 3-8 wt. %.

14. The synergistic agricultural formula of claim 10, wherein the diformylurea is present in 3-8 wt. %.

15. A synergistic agricultural formula that is absorbed by the plant consisting of:

30 to 0.5 wt. % diformylurea; and 0.1 to 20 wt. % at least one mixture of nutrients provided as an aqueous solution so that said nutrients may be absorbed by the plant, wherein said at least one mixture of nutrients comprises magnesium, copper, manganese and zinc as the only nutrients present in said formula, wherein said nutrients are chelated compounds;

optional oil, optional surfactant, and water.

16. The synergistic agricultural formula of claim 15, wherein the diformylurea is present in 3-8 wt. %.

17. The synergistic agricultural formula of claim 16, wherein said at least one mixture of nutrients includes 1-3 wt. % magnesium, 1-3 wt. % copper, 1-3 wt. % manganese and 1-3 wt. % zinc based on the total weight of the agricultural formula, wherein the magnesium, copper, manganese, and zinc are the only nutrients present in said formula.

* * * * *